United States Patent
Lin et al.

(10) Patent No.: US 8,559,975 B2
(45) Date of Patent: Oct. 15, 2013

(54) LOCATION DETERMINATION BASED ON WEIGHTED RECEIVED SIGNAL STRENGTHS

(75) Inventors: Jyh-Han Lin, Mercer Island, WA (US); Pradipta Kumar Basu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/252,605

(22) Filed: Oct. 4, 2011

(65) Prior Publication Data

US 2013/0023282 A1 Jan. 24, 2013

Related U.S. Application Data

(63) Continuation-in-part of application No. 13/188,464, filed on Jul. 22, 2011, now abandoned.

(51) Int. Cl.
*H04W 24/00* (2009.01)
(52) U.S. Cl.
USPC ..................................................... 455/456.1
(58) Field of Classification Search
USPC ................................ 455/456.1, 404.2, 41.2; 342/357.31–357.49
See application file for complete search history.

(56) References Cited

U.S. PATENT DOCUMENTS

| | | | |
|---|---|---|---|
| 6,799,047 B1 * | 9/2004 | Bahl et al. .................. | 455/456.1 |
| 7,116,988 B2 | 10/2006 | Dietrich | |
| 7,359,718 B2 | 4/2008 | Tao | |
| 7,406,116 B2 | 7/2008 | Agrawala | |
| 7,414,988 B2 | 8/2008 | Jones et al. | |
| 7,809,857 B2 | 10/2010 | Anderson | |
| 7,873,367 B2 | 1/2011 | Malik | |
| 2003/0130899 A1 | 7/2003 | Ferguson et al. | |
| 2007/0010956 A1 * | 1/2007 | Nerguizian et al. ............. | 702/57 |
| 2010/0026513 A1 | 2/2010 | Pandey | |
| 2010/0130230 A1 | 5/2010 | Aggarwal | |
| 2012/0184292 A1 * | 7/2012 | Lin et al. .................... | 455/456.1 |
| 2012/0185458 A1 * | 7/2012 | Liu et al. ...................... | 707/709 |
| 2012/0286997 A1 * | 11/2012 | Lin et al. ...................... | 342/451 |
| 2012/0303556 A1 * | 11/2012 | Lin et al. ......................... | 706/12 |
| 2013/0018629 A1 * | 1/2013 | Sidhu et al. .................. | 702/150 |
| 2013/0018826 A1 * | 1/2013 | Sundararajan et al. ......... | 706/12 |
| 2013/0041941 A1 * | 2/2013 | Tomasic et al. ............... | 709/203 |

OTHER PUBLICATIONS

U.S. Appl. No. 13/188,464, filed Jul. 22, 2011, Jyh-Han Lin (Continued)

*Primary Examiner* — San Htun
*Assistant Examiner* — Magdi Elhag
(74) *Attorney, Agent, or Firm* — Microsoft Corporation

(57) ABSTRACT

Training datasets and test datasets consisting of observations (i.e., RSS measurements) partitioned per a mapping tile system are used to evaluate possible RSS weighting functions for each such tile. The observations from the training dataset are used to determine an optimal weighting function based on the training dataset that minimizes the error for the test data, wherein the error may be a function of the deltas between GPS positions of observations in the test dataset and predicted positions from the RSS weighted functions applied to test data. The accuracy of the optimal weighted function for each tile is characterized to determine whether to use the weighted function or an alternative (such as a non-weighted function) for subsequent inquiries.

14 Claims, 10 Drawing Sheets

(56) References Cited

OTHER PUBLICATIONS

Kuo, et al., "Discriminant Minimization Search for Large-Scale RF-Based Localization Systems", Retrieved at <<http://ieeexplore.ieee.org/stamp/stamp.jsp?arnumber=05453380>>, IEEE Transactions on Mobile Computing, vol. 10, No. 2, Feb. 2011, pp. 291-304.

Schumann, et al., "Improved Weighted Centroid Localization in Smart Ubiquitous Environments", Retrieved at <<http://www.imd.uni-rostock.de/veroeff/2008-06_Improved_Weighted_Centroid_Localization.pdf>>, 2008, pp. 15.

Xuan, et al., "An RSS-based localization scheme using direction calibration and reliability factor information for wireless sensor networks", Retrieved at <<http://www.sciweavers.org/external.php?u=http%3A%2F%2Fwww.itiis.org%2Fdownload.jsp%3Ffilename%3DTIIS_Vol4No3Feb2010.pdf&p=>>, KSII Transactions on Internet and Information Systems, vol. 4, No. 1, Feb. 2010, pp. 45-61.

Kumar, et al., "Range Free Localization Schemes for Wireless Sensor Networks", Retrieved at <<http://www.wseas.us/e-library/conferences/2011/Cambridge/SEPADS/SEPADS-14.pdf>>, Recent Researches in Software Engineering, Parallel and Distributed Systems, Feb. 20-22, 2011, pp. 101-106.

Littau, et al., "Clustering Very Large Data Sets with Principal Direction Divisive Partitioning", Retrieved at <<http://www-users.cs.umn.edu/~boley/publications/papers/P2005-2.pdf>>, 2005, pp. 29.

Blumenthal, et al., "Weighted Centroid Localization in Zigbee-based Sensor Networks", Retrieved at <<http://www.imd.uni-rostock.de/veroeff/2007_10_05_-_WISP2007_WeightedCentroidLocalizationInZigBee.pdf>>, 2007, pp. 6.

"Partitioning Data into Training and Testing Sets (Analysis Services—Data Mining)", Retrieved at <<http://msdn.microsoft.com/en-us/library/bb895173.aspx>>, Retrieved Date: Apr. 4, 2011, pp. 4.

"Comparison of Modeling and Inference Methods At Multiple Spatial Resolutions", U.S. Appl. No. 13/117,169, filed May 27, 2011, pp. 45.

Locher, Thomas, et al., "Received-Signal-Strength-Based Logical Positioning Resilient to Signal Fluctuation", Proceedings: Software Engineering, Artificial Intelligence, Networking and Parallel/Distributed Computing, 2005 and First ACIS International Workshop on Self-Assembling Wireless Networks. SNPD/SAWN 2005—Sixth International Conference on, May 23-25, 2005, pp. 396-402, http://ieeexplore.ieee.org/xpl/freeabs_all.jsp?arnumber=1434919.

* cited by examiner

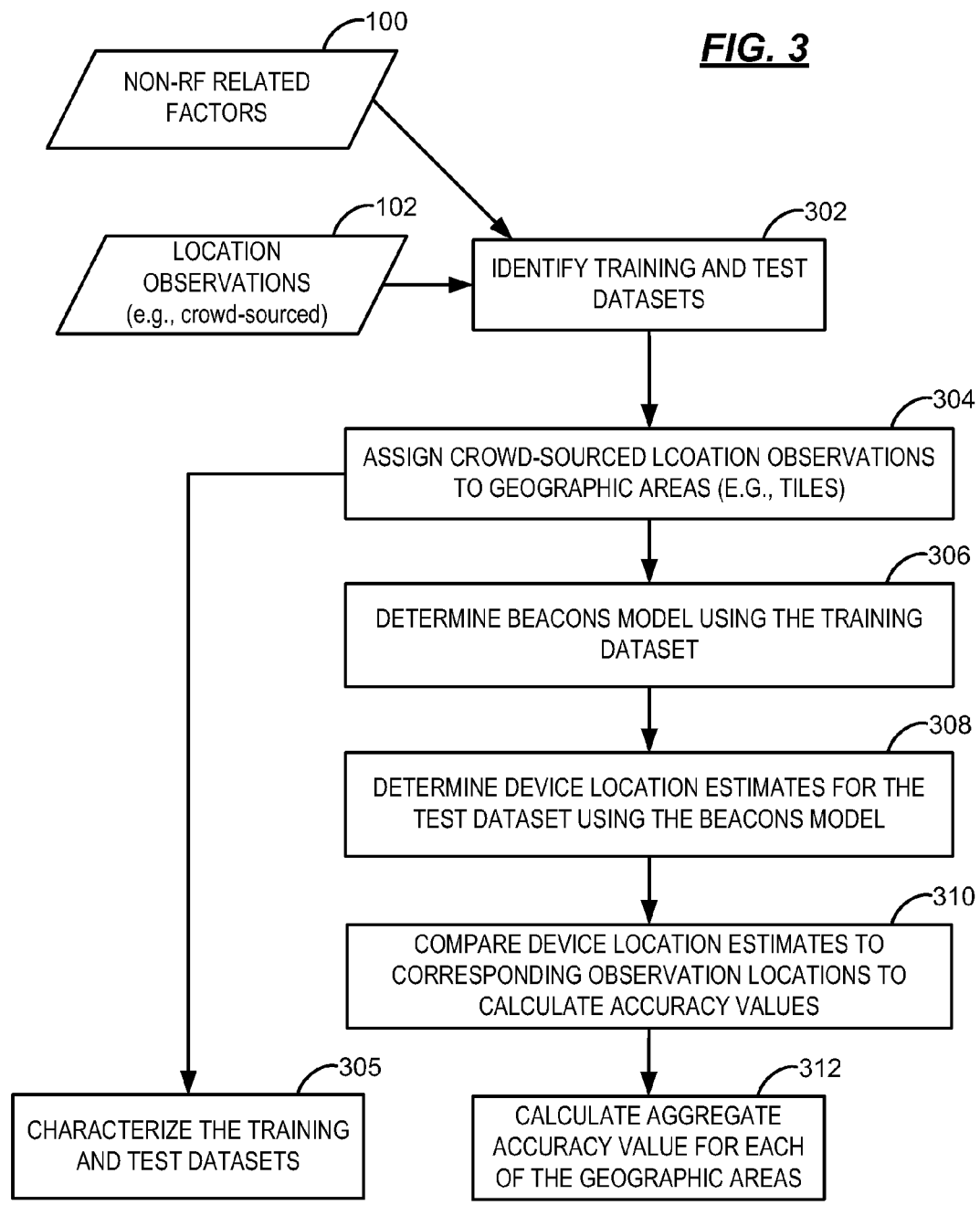

LOCATION DETERMINATION BASED ON WEIGHTED RECEIVED SIGNAL STRENGTHS

CROSS-REFERENCE TO RELATED APPLICATIONS

This application is a continuation-in-part of pending U.S. patent application Ser. No. 13/188,464, "LOCATION DETERMINATION BASED ON WEIGHTED RECEIVED SIGNAL STRENGTHS," filed Jul. 22, 2011, the entire content of which is hereby incorporated by reference.

BACKGROUND

The objective of a typical terrestrial-based location service for mobile devices is to infer the location of a client device at a given instance of time relative to the known locations of a set of network beacons. Wi-Fi positioning system (WPS) can provide location in certain situations (such as indoors) by taking advantage of the rapid growth of wireless access points (WAPs) as beacons in urban areas. A provider of this type of service maintains a public database and can determine the position for a device based on the specific access points accessible from the device in each specific location. The localization technique used for positioning with wireless access points is based on measuring the intensity of the received signal (Received Signal Strength or "RSS") to more uniquely identify each location (usually arranged in a grid comprising a plurality of tiles) using radio frequency (RF) locating methodologies.

However, while it may be generally straightforward and relatively low-cost to implement an RSS-based location service, there are several shortcomings to RSS that limit its accuracy. First, there may be large variations in signal strength at any specific location resulting from electromagnetic interference or multipath propagation of the radio frequency signals. Second, RF propagation is location and environment specific such that two adjacent locations may have very different RF propagation obstacles, and changes in the environment can vary RF signals from moment to moment. Third, RSS measurements can vary based on the orientation of the receiving device and surrounding objects such as human bodies (including the body of the user of the receiving device). In addition, variations in RSS measurements among different device models and even on different devices of the same model can obscure the precision of RSS methods.

SUMMARY

An RSS-weighted centroid technique uses beacon data that are given weights based on their respective RSSs such that stronger RSSs are presumed to indicate beacons that are closer to the device, thereby providing a more accurate measurement of RSS.

Several implementations are directed to the use of training datasets and test datasets comprising observations (i.e., RSS measurements) partitioned per a mapping tile system. A model is created that consists of a training data set and a possible RSS weighting function for each tile, and the observations from the training dataset are then used to determine an optimal weighting function based on the training dataset that minimizes the error for the test data. The error may be a function of the deltas between GPS positions of observations in the test dataset and predicted positions from the RSS weighted functions applied to test data. The accuracy of the optimal weighted function for each tile is then characterized again using the test data to determine whether the weighted function or an alternative (such as a non-weighted function) provide better accuracy.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings:

FIG. 3 is an exemplary flowchart illustrating operation of a computing device to calculate aggregate accuracy values associated with performance of location determination methods;

DETAILED DESCRIPTION

When connecting to a mobile communications network, a mobile communications device often receives a "fix" (a generalized location corresponding to the nearest cell tower that will service the device) within seconds during the registration process. Often these fixes are then cached for several minutes and, during this time, any queries made using the mobile device will reuse the same generalized location information (the fix) on the assumption the mobile device is still in the same location absent evidence to the contrary (such as a lost signal).

Mobile locating refers to services provided by telecommunication companies to approximate the location of a mobile communications device (such as a mobile phone). The underlying technology is based on measuring power levels and antenna patterns. Since a mobile communications device generally communicates wirelessly with the base station closest to it, and the identity of that base station and its location are readily ascertainable, the location of the device can be correctly presumed to be close to the respective base station. Some base stations employing more advanced location systems might also determine the sector in which the mobile phone resides (i.e., an approximate direction away from the base station) as well as estimate the distance from the base station. Further approximation and refinement may also be achieved by interpolating signals between the device and neighboring base stations. Where mobile traffic and density of base stations is sufficiently high, the precision of an estimated location may be determined to within 50 meters of actual location, whereas areas where base stations are distantly located one from another (such as a rural setting where many miles may lie between base stations) locations may be determined much less precisely.

Mobile communications device locating also tracks the location of a device even when the device is in motion. To locate the device, the device itself emits at least the roaming signal to contact the next nearby antenna tower, which is a process that does not use an active call. Location determination may then be done by multilateration based on the signal strength to nearby antenna masts.

Figure 1:
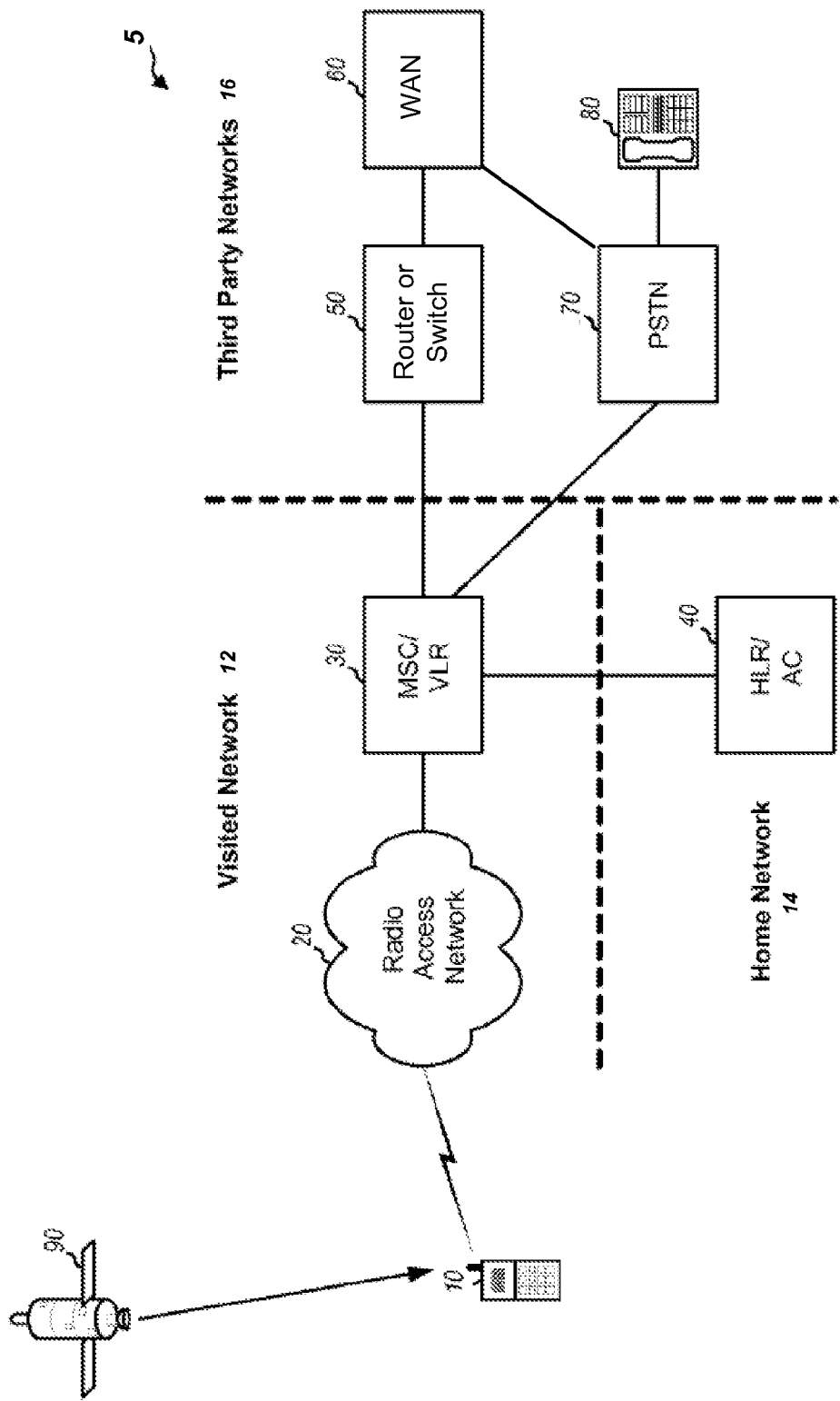
FIG. 1 is an illustration of an exemplary mobile communications network.

FIG. 1 is an illustration of an exemplary mobile communications network 5. The mobile communications network 5 may include a visited network 12, a home network 14, and third party networks 16. The visited network 12 may also be referred to as a Visited Public Land Mobile Network (VPLMN), a serving network, a roaming network, etc. Home network 14 may also be referred to as a Home Public Land Mobile Network (HPLMN). The visited network 12 may be a serving network for a mobile communications and/or computer (MCC) device 10 which may be operating in or roaming from its home network 14. Conversely, the visited network 12 and home network 14 may be the same network if the MCC device 10 is not roaming.

The visited network 12 may include one or more base stations (or "beacons") at the radio access network (RAN) 20, a Mobile Switching Center (MSC)/Visitor Location Register (VLR) 30, and other network entities not shown in FIG. 1 for simplicity. RAN 20 may be a Global System for Mobile Communications (GSM) network, a Wideband Code Division Multiple Access (WCDMA) network, a General Packet Radio Service (GPRS) access network, wireless fidelity (Wi-Fi) network, 14G/Wi-Max network, a Long Term Evolution (LTE) network, CDMA X network, a High Rate Packet Data (HRPD) network, an Ultra Mobile Broadband (UMB) network, etc. GSM, WCDMA, GPRS and LTE are part of Universal Mobile Telecommunication System (UMTS) and are described in documents from an organization named "3rd Generation Partnership Project" (3GPP). CDMA X and HRPD are part of cdma2000, and cdma2000 and UMB are described in documents from an organization named "3rd Generation Partnership Project 2" (3GPP2). The MSC may perform switching functions for circuit-switched calls and may also route Short Message Service (SMS) messages. The VLR may store registration information for terminals that have registered with visited network 12.

Home network 14 may include a Home Location Register (HLR)/Authentication Center (AC) 40 and other network entities not shown in FIG. 1 for simplicity. The HLR may store subscription information for terminals (including MCC device 10) that have service subscription with home network 14. The AC may perform authentication for terminals (including MCC device 10) having service subscription with home network 14.

Third party networks 16 may include a router or switch 50, a Public Switched Telephone Network (PSTN) 70, and possibly other network entities not shown in FIG. 1. Router or switch 50 may route communications between MSC/VLR 30 and a wide area network (WAN) 60 (such as the Internet). PSTN 70 may provide telephone services for conventional wireline telephones, such as a telephone 80. Of course, FIG. 1 shows only some of the network entities that may be present in the visited network 12 and the home network 14. For example, visited network 12 may include network entities supporting packet-switched calls and other services, as well a location server to assist in obtaining location information for a terminal, e.g., MCC device 10, as discussed elsewhere herein.

The MCC device 10, as a wireless communications terminal, may be also be thought of (and variously referred to as) a mobile station (MS) in GSM and CDMA X, a user equipment (UE) in WCDMA and LTE, an access terminal (AT) in HRPD, a SUPL enabled terminal (SET) in Secure User Plane Location (SUPL), a subscriber unit, a station, and so forth. The MCC device 10 may also comprise or communicate with a personal navigation device (PND), and satellite signal reception, assistance data reception, and/or position-related processing may occurs at the MCC device 10 or, alternately, at the PND. The MCC device 10 may have a service subscription with home network 14 and may be roaming in visited network 12, as shown in FIG. 1.

When activated, the MCC device 10 may receive signals from RAN 20 in visited network 12 and communicate with the RAN 20 to obtain communication services. The MCC device 10 may also communicate with home network 14 for communication services when not roaming. The MCC device 10 may also receive, via its PND, signals from one or more satellites 90 which may be part of a satellite positioning system (SPS). As used herein an SPS may include any combination of one or more global and/or regional navigation satellite systems and/or augmentation systems, and SPS signals may include SPS, SPS-like, and/or other signals associated with such one or more SPS. As such, the MCC device 10 may measure signals from satellites 90 and obtain pseudo-range measurements for the satellites. The MCC device 10 may also measure signals from base stations in RAN 20 and obtain timing and/or signal strength measurements for the base stations. The pseudo-range measurements, timing measurements and/or signal strength measurements may be used to derive a position estimate or location estimate and location information for the MCC device 10, as discussed elsewhere herein.

In order to route calls to a mobile communications device, base stations listen for a roaming signal sent from the device and then collectively determine which specific station is best able to communicate with the mobile device (e.g., the closest base station with adequate capacity for managing the device). As the mobile device changes location, the base stations monitor the signal and the device is handed-off (or "roamed") from a first station to an adjacent second station as appropriate. Thus, by comparing the relative signal strength from multiple antenna towers, a general location of a phone can be roughly determined. The location can be even more precisely determined when a base station's antenna pattern supports angular determination and phase discrimination. Indeed, the accuracy of various base station locating techniques varies, with a connection to a single base station (the location of the base station corresponding to a "cell identification" as a surrogate for the device location) being the least accurate, triangulation with multiple base stations being moderately accurate, and certain "Forward Link" timing methods as being the most accurate. Moreover, the accuracy of these techniques (collectively referred to as "network-based") is dependent both upon the concentration of the base stations—with urban environments achieving the highest possible accuracy—as well as the implementation of the most current timing methods.

In contrast to network-based techniques, handset-based location technologies generally use the installation of client software on the mobile communications device in order to autonomously determine location. Such techniques then determine the location of the device by computing location by cell identification and the signal strengths of the home and neighboring cells (i.e., base stations) which is continuously sent to the carrier network. In addition, if the device is also equipped with GPS (global positioning system) then significantly more precise location information may be sent from the handset to the carrier. Similarly, hybrid positioning systems use a combination of network-based and handset-based technologies for location determination. One example would be some modes of A-GPS, which can both use GPS and network information to compute the location—although in most A-GPS systems all computations are done by the handset, and the network is only used to initially acquire and use the GPS satellites.

The objective of a location service is to infer the location of a client device at a given instance of time. Consequently, networks of land-based positioning transmitters (or "beacons") can enable specialized radio receivers to determine a two-dimensional position (longitude and latitude) on the surface of the Earth. Often these systems may be generally less accurate than any of the Global Navigation Satellite Systems (GNSS)—such as GPS—largely because the propagation of their signals is not entirely restricted to line-of-sight; however, they remain useful for environments unsuitable for GNSS—such as underground or in indoor environments—and the corresponding receivers often require much less power than GNSS systems like GPS.

GPS is a satellite navigation system that uses more than two dozen GPS satellites that orbit the Earth and transmit radio signals which are received by and allow GPS receivers to determine their own location, speed, and direction. In basic operation, the GPS satellites transmit signals to GPS receivers on the ground, and the GPS receivers passively receive these satellite signals and process them to determine location.

The horizontal estimated position error (HEPE) is a measure of the GPS receiver's accuracy with regard to its determination of its location on the ground (longitude and latitude). For example, if a GPS receiver's HEPE is 43 feet, the GPS receiver has determined that its calculated position (without regard to altitude) is accurate to within 43 feet. Similarly, an estimated position error (EPE) is a measure of the GPS receiver's accuracy with regard to its determination of its three-dimensional location (longitude, latitude, and altitude); however, there is inherent difficulty in calculating altitude with GPS, and thus EPE is generally larger (sometimes substantially larger) than the HEPE. Viewed differently, a HEPE is basically an EPE without the inaccuracy of an altitude determination.

In general, a GPS receiver requires an unobstructed view of a minimum number of GPS satellites in the sky in order to perform a location determination (at least three satellites for longitude and latitude, and at least four satellites to further include altitude). Consequently, GPS receivers often do not perform well in forested areas, among tall buildings in a city setting, or inside buildings and other structures. To assist the GPS receiver in such environments, some location devices may use various forms of Location-Based Services (LBS) to assist the GPS receiver in determining its location or to independently determine the location in lieu of the GPS receiver. For example, A-GPS ("Assisted-GPS") is a well-known LBS technology that uses an assistance server to reduce the time needed to determine a location using GPS.

In contrast, LBS and other terrestrial-based location services are a combination of computational servers and ground-based "beacons." A beacon may be any RF-transmitting entity that is self-identifying and has a known location, such as Wi-Fi or Wireless Access Points (WAPs) and mobile communication base stations (both of which may also be generally referred to herein simply as access point or an "AP"). Using beacons, an LBS provides the ability for a location device to obtain its current location and, in certain implementations, to provide additional services such as identifying nearby points-of-interest such as gas stations, hotels, restaurants, banks, stores, coffee shops, shopping, parking, etc. For example, the Business Mobility Framework (BMF) is an LBS infrastructure that allows server-based LBS solutions to request and obtain device location information. LBS can also be used to support Enhanced Local Search (ELS) functionality via the Internet to execute local search queries to find locations and obtain directions to desired destinations, both indoors and outdoors.

In general, GPS services are a range-based location system. Ranging is the process of measuring distance from one object (e.g., a transmitter) to another object (e.g., a receiver). Some ranged-based location methods (such as GPS) measure differences between the time of transmission and the time of reception using highly-accurate and highly-synchronized clocks. Range-free location methods, on the other hand, do not directly measure range, such as most RSS systems disclosed herein. Yet other systems may use both range-based and range-free measurements to determine highly-accurate locations.

Moreover, GPS services use trilateration to determine location. Trilateration involves the calculation of a location (absolutely or relatively) by measuring distances from the receiving device to GPS satellites in orbit to derive a geometric set of intersecting concentric spheres. Triangulation, on the other hand, is the process of determining the location of a point by measuring angles to it from known points at known locations. With two such known points, the location can be fixed as the third point of a triangle having one known side and two known angles. However, the terms "trilateration" and "triangulation" are often used interchangeably (and the latter used more generally to refer to either or both), and both terms are used interchangeably herein except where noted or where differentiation is apparent from the context of the use of such terms.

For example, Advanced Forward Link Trilateration (AFLT) is a method of location determination that utilizes base station trilateration to calculate location for a mobile communications device. To determine location, the mobile device takes measurements of signals from nearby mobile communications base stations (a.k.a., "cell towers") and reports time/distance readings back to the communication network which are then used to triangulate an approximate location of the handset. Similar to GPS, at least three surrounding base stations are required to get a position fix, although AFLT does not use GPS satellites (and only uses cell towers) to determine location. Thus the accuracy of AFLT is limited to the geometry of the cell towers surrounding the device requesting location information—the better the triangulation the more accurate the fix. In any event, AFLT enables location services to work indoors, whereas outdoor location services often use the more accurate GPS signals when available.

Another example is LORAN-C, a terrestrial navigation system—most commonly used to determine the position of a ship or aircraft—that uses low frequency radio transmitters that use the time interval between radio signals received from three or more beacon stations. Recently, LORAN use has been in steep decline (with GPS being the primary replacement), although there is some interest in revitalizing LORAN—which operates in the low frequency portion of the EM spectrum from 90 to 110 kHz—since its signals are less susceptible to interference and can penetrate better into foliage and buildings than GPS signals.

Assisted GPS (A-GPS) is a system which, under certain conditions, can improve the startup performance (or "time-to-first-fix," TTFF) of a GPS receiver. A-GPS is used extensively with GPS-capable cellular phones as its development was accelerated by the U.S. Federal Communications Commission's "E911 Mandate" requiring that the location of a mobile communications device be made immediately available to emergency call dispatchers.

While standalone or autonomous GPS devices use only the signals from GPS satellites, an A-GPS device additionally uses LBS network resources to help it locate and utilize the GPS satellites both faster and better in poor signal conditions. For example, in areas of very poor signal conditions (such as in a city), GPS signals may suffer multipath propagation (e.g., bouncing and reflecting off of buildings) or be weakened by passing through signal obstructions such as atmospheric conditions, walls and roofs, or tree cover. Consequently, when first powered on in these conditions, some autonomous GPS navigation devices may find it difficult to determine a location due to fragmentary signal reception, thereby rendering such devices unable to function unless and until clear signals can be received continuously for an adequate period of time (which may be several minutes).

An A-GPS device addresses these challenges by using data available from LBS in two regards: satellite acquisition and position calculation. With regard to the former, LBS-provided information might include orbital data for the GPS satellites that may allow the GPS receiver to lock on to a minimal number of satellites more rapidly. Moreover, the network can provide precise timing information used to render accurate GPS information. In addition, the general location of the device as determined by the nearby base stations enables the LBS to provide information pertaining to local ionospheric conditions and other conditions that can adversely affect GPS signals. Regarding the latter, an LBS "assistance server" generally possesses much higher computational power than the mobile device and, thus, can be used to more quickly perform the calculations used to determine location, and particularly the extremely difficult and complex calculations that use fragmentary GPS signals received by the mobile device. Indeed, in several A-GPS device implementations (such as those known as "MS-Assisted" A-GPS devices), the amount of CPU and programming used by the GPS receiver can be substantially reduced by offloading most of the work onto the assistance server. Conveniently, most A-GPS devices have the option of falling back to standalone or autonomous GPS operations when the network (and the assistance server) is unavailable. In addition, many mobile communications devices combine A-GPS and other location services including Wi-Fi positioning, base station triangulation, and other positioning technologies.

Wi-Fi positioning system (WPS) can also provide position in certain situations (such as indoors) by taking advantage of the rapid growth of wireless access points in urban areas. A provider of this type of service maintains a public database and can determine the position for a device based on the specific access points accessible from the device in each specific location. The localization technique used for positioning with wireless access points is based on measuring the intensity of the received signal (Received Signal Strength or "RSS"). Of course, it should be noted that while RSS can also be used in "fingerprinting" possible device locations (said locations usually arranged in a grid comprising a plurality of tiles), raw observations are the models for such fingerprinting methods whereas for the various implementations disclosed herein (collectively comprising a "beacon based method") these observations are refined into beacon models for deriving location inferences. In general, RSS-based methods provide a means by which a client device can locate itself (generally working hand-in-hand with a location service) by detecting RSS from local beacons. However, RSS readings can vary for a variety of reasons (previously discussed), and thus enhanced pattern matching methods (PMMs) for locating a client device have been developed that use both RSS information and additional attributes that may correspond to device types, HEPE, speed of the device, and so forth to more narrowly and discriminately determine location.

Of course, RSS at a receiver generally decreases as the distance from the radio frequency transmitter (e.g., a beacon) increases, although the rate of decrease depends on the RF propagation environment. (It is noted that RSS is given as a negative value measured in dBm such that values closer to zero indicate a stronger signal—for example, a −20 dBm RSS is stronger than −40 dBm RSS.) Moreover, the accuracy of such RSS-based approaches depends on the number of positions that have been entered into the database. The possible signal fluctuations that may occur, however, can increase errors and inaccuracies in the path of the user. To minimize fluctuations in the received signal, certain techniques can be applied to filter this kind of "noise," and various implementations disclosed herein may employ such techniques.

It should be noted that, in many RSS-based methods, the signal levels detected from a Wi-Fi device may be found using multiple access points as in triangulation which attempts to determine a distance from each access point to the detecting device. However, there are several shortcomings to RSS that limit its accuracy. First, there may be large variations in signal strength at any specific location resulting from electromagnetic interference or multipath propagation of the radio frequency signals. Second, RF propagation is location and environment specific such that two adjacent locations may have very different RF propagation obstacles, and changes in the environment can vary RF signals from moment to moment. Third, RSS measurements can vary based on the orientation of the receiving device and surrounding objects such as human bodies (including the body of the user of the receiving device). In addition, variations in RSS measurements among different device models and even on different devices of the same model can obscure the precision of RSS methods. In view of these challenges, conventional RSS-based methods are generally limited without tailoring the location method to specific location, environment, device types, and other factors. To address these challenges, various implementations disclosed herein pertain to addressing the specific challenge of RF propagation and, given that RF propagation is location and environment specific, adapting to local conditions automatically and continuously.

Figure 2A:
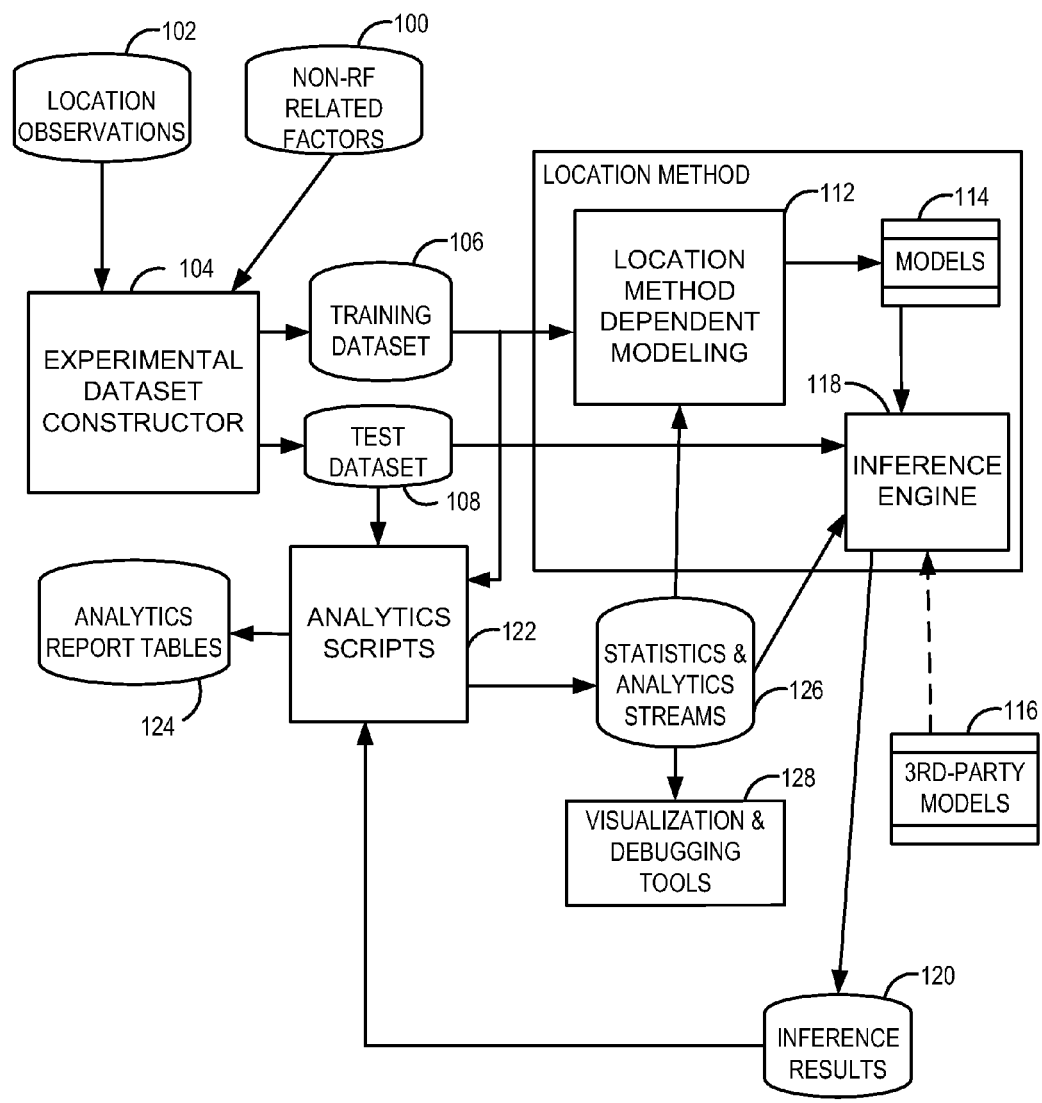
FIG. 2A is an exemplary block diagram illustrating a locating experimentation framework for analyzing location determination methods using location observations divided into a training dataset and a test dataset.
Figure 2B:
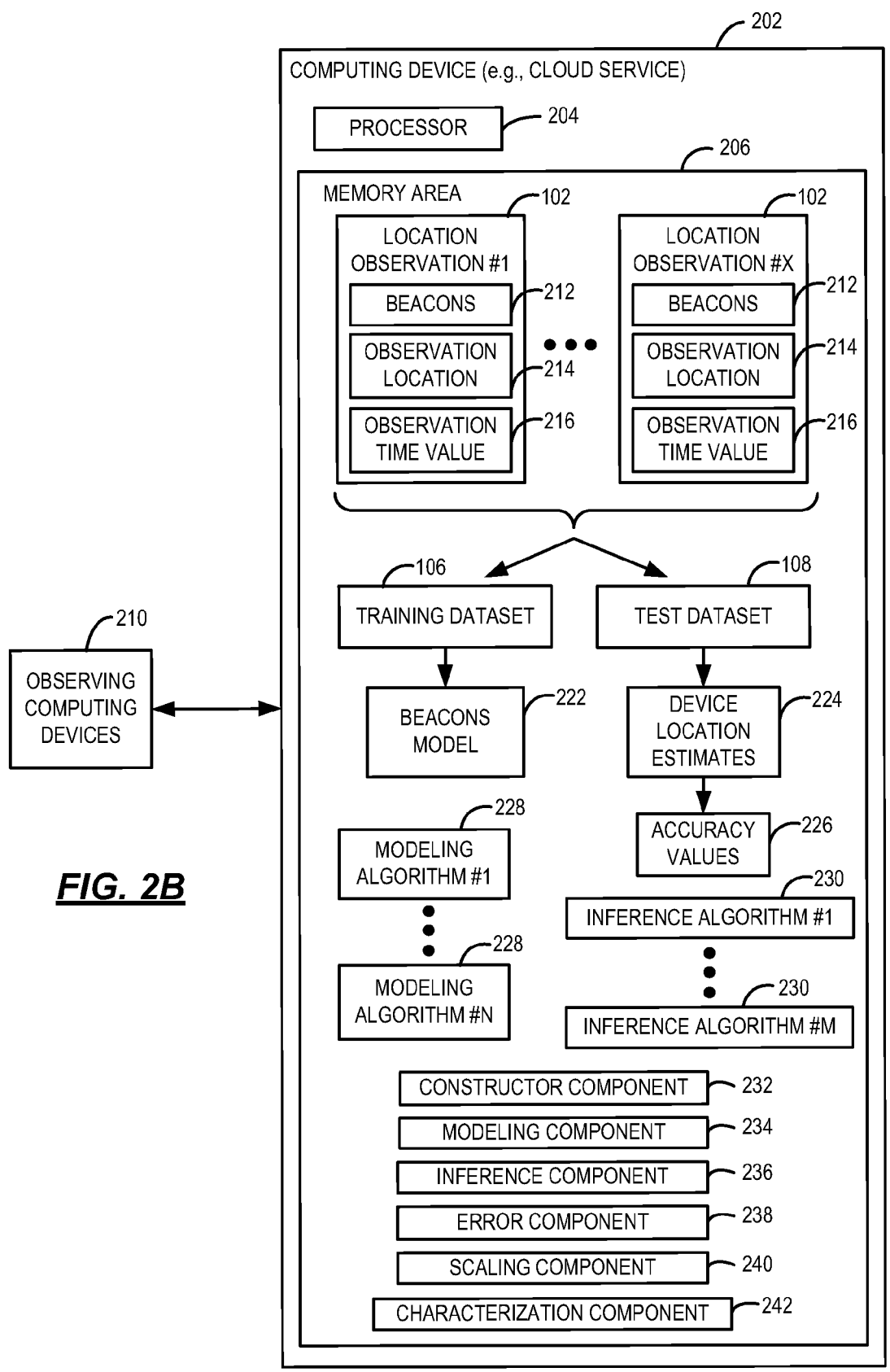
FIG. 2B is an exemplary block diagram illustrating a computing device for analyzing modeling algorithms and location inference algorithms based on the results of the locating experimentation framework of FIG. 2A.

FIG. 2A is an exemplary block diagram illustrating a locating experimentation framework for analyzing location determination methods using location observations divided into a training dataset and a test dataset. FIG. 2B is an exemplary block diagram illustrating a computing device for analyzing modeling algorithms and location inference algorithms based on the results of the locating experimentation framework of FIG. 2A.

Referring to FIGS. 2A and 2B (collectively referred to hereinafter as FIG. 2), various implementations disclosed herein are operable in an environment in which MCC devices such as mobile computing devices or other observing computing devices 210 (an example of which is described with respect to FIG. 8) observe or detect one or more beacons 212 at approximately the same time (e.g., an observation time value 216) while the device is at a particular location (e.g., an observation location 214). The set of observed beacons 212, the observation location 214, the observation time value 216, and possibly other attributes constitute a location observation as well as non-RF related factors 100. The mobile computing devices detect or observe the beacons 212, or other cell sites, via one or more radio frequency (RF) sensors associated with the mobile computing devices. Aspects of the disclosure are operable with any beacon supporting any quantity and type of wireless communication modes including cellular division multiple access (CDMA), Global System for Mobile Communication (GSM), wireless fidelity (Wi-Fi), 4G/Wi-Max, and the like. Exemplary beacons 212 include cellular towers (or sectors if directional antennas are employed), base stations, base transceiver stations, base station sites, Wi-Fi access points, satellites, or other wireless access points (WAPs). While aspects of the disclosure may be described with reference to beacons 212 implementing protocols such as the 802.11 family of protocols, implementations of the disclosure are operable with any beacon for wireless communication. Moreover, while aspects of the disclosure may be described with reference to any specific beacon for wireless communication (e.g., "base station"), such implementations explicitly include, for alternative implementations, the use of any other beacon for wireless communication (e.g., "cell tower"), and thus terms referring to beacons 212 for wireless communication are used interchangeably herein without loss of generality.

Referring to FIG. 2A, an exemplary block diagram illustrates the location experimentation framework for analyzing location determination methods using both RF-based location observations 102 as well as non-RF related factors 100 (such as GPS HEPE) which are together grouped into a training dataset 106 and a test dataset 108. The training dataset 106 includes training location observations, and the test dataset 108 includes test location observations. The location experimentation framework includes an experimental dataset constructor 104, which divides location observations 102 and non-RF related factors 100 into the training dataset 106 and the test dataset 108. In some implementations, the training dataset 106 and the test dataset 108 are mutually exclusive (e.g., no overlap). In other implementations, at least one location observation and at least one non-RF location factor are included in both the training dataset 106 and the test dataset 108.

Referring more generally to FIG. 2 (i.e., both FIGS. 2A and 2B), and using locating method dependent modeling 112 (e.g., a modeling algorithm 228 and a location inference algorithm 230 in FIG. 2B), models 114 are constructed from the training dataset 106. For several implementations, the training algorithm uses the training dataset to build beacon models where a beacon model may comprise, for example, a beacon position and a 95% radius estimate for each beacon. In the training phase, the corresponding GPS positions are also provided to the algorithm. For the RSS-based weighting method, the parameters to be set for the training algorithm are the RSS weighting functions.

Thus the models 114 include a set of beacons 212 and the locations of each of the beacons 212. An inference engine 118 applies at least one of the location inference algorithms to the test dataset 108 and uses the models 114 to infer location inference results 120 such as device location estimates 224 for the observing computing devices 210. In certain implementations, the algorithm selects a subset of beacons from the model corresponding to a specific inference request. In other words, the beacon model built in the training phase is used to predict positions of test sample in the test dataset, and thus in the test phase the GPS positions are withheld from the prediction algorithm.

In some implementations, the inference engine 118 also uses third-party models 116 to produce the location inference results 120. The device location estimates 224 represent inferred locations of the observing computing devices 210 in each of the location observations 102 in the test dataset 108, taking into account the non-RF related factors 100 that are available. Analytics scripts 122 analyze the inference results 120 in view of the training dataset 106 and the test dataset 108 to produce analytic report tables 124 and statistics and analytics streams 126. The analytics scripts 122, in general, calculate the accuracy of the locating method, such as an error distance. For various implementations, the error of a test sample is the difference (e.g., the Euclidean distance) between the GPS position of the sample (which is withheld from the prediction algorithm) and the predicted position. The optimal weighting function (that is, the parameters for training and testing algorithms) used for a particular geographical area are those that minimize the error for the test data in that geographical area.

Referring to FIG. 2B, an exemplary block diagram illustrates a computing device 202 for analyzing modeling algorithms 228 and location inference algorithms 230. In some implementations, the computing device 202 represents a cloud service for implementing aspects of the disclosure. For example, the cloud service may be a location service accessing location observations 102 stored in a beacon store. In such implementations, the computing device 202 is not a single device as illustrated, but rather a collection of a plurality of processing devices and storage areas arranged to implement the cloud service. An example computing device is described with respect to FIG. 8.

In general, the computing device 202 represents any device executing instructions (e.g., as application programs, operating system functionality, or both) to implement the operations and functionality associated with the computing device 202. The computing device 202 may also include a mobile computing device or any other portable device. In some implementations, the mobile computing device includes a mobile telephone, smart phone, laptop, tablet, computing pad, netbook, gaming device, and/or portable media player. The computing device 202 may also include less portable devices such as desktop personal computers, kiosks, and tabletop devices. Additionally, the computing device 202 may represent a group of processing units or other computing devices.

The computing device 202 has at least one processor 204 and a memory area 206. The processor 204 includes any quantity of processing units, and is programmed to execute computer-executable instructions for implementing aspects of the disclosure. The instructions may be performed by the processor 204 or by multiple processors executing within the computing device 202, or performed by a processor external to the computing device 202. In some implementations, the processor 204 is programmed to execute instructions such as those described elsewhere herein.

The computing device 202 further has one or more computer readable media such as the memory area 206. The memory area 206 includes any quantity of media associated with or accessible by the computing device 202. The memory area 206 may be internal to the computing device 202 (as shown in FIG. 2B), external to the computing device 202 (not shown), or both (not shown). The memory area 206 stores, among other data, one or more location observations 102 such as location observation #1 through location observation #X, as well as any non-RF related factors 100. In the example of FIG. 2B, each of the location observations 102 includes a set of one or more beacons 212, an observation location 214, an observation time value 216, and other properties describing the observed beacons 212 and/or the observing computing device (which may include the non-RF related factors 100). An exemplary observation location 214 may include values for a latitude, longitude, and altitude of the observing computing device as determined by certain RF methodologies and/or utilizing available non-RF related data. For example, the observation location 214 of the observing computing device may be determined via a global locating system (e.g., GPS) receiver associated with the observing computing device.

The computing device 202 may receive the location observations 102 (as well as any non-RF related factors 100) directly from the observing computing devices 210. Alternatively or in addition, the computing device 202 may retrieve or otherwise access one or more of the location observations 102 (or non-RF related factors 100) from another storage area such as a beacon store. In such implementations, the observing computing devices 210 transmit, via a network, the location observations 102 (and the non-RF related factors 100) to the beacon store for access by the computing device 202 (and possibly other devices as well). The beacon store may be associated with, for example, a locating service that crowd-sources the location observations 102. The network includes any means for communication between the observing computing devices 210 and the beacon store or the computing device 202.

As described herein, aspects of the disclosure operate to divide, separate, construct, assign, or otherwise create the training dataset 106 and the test dataset 108 from the location observations 102 and the non-RF related factors 100 (e.g., non-RF related location factors). The training dataset 106 is used to generate the beacon related data model (e.g., beacons model 222) of the location inference algorithm 230. For some location inference algorithms, the model includes beacon location estimates of the beacons 212 therein. Aspects of the disclosure further calculate, using the beacon models, the estimated locations (e.g., device location estimates 224) of the observing computing devices 210 in the test dataset 108. Each of the device location estimates 224 identifies a calculated location of one of the observing computing devices 210 (e.g., mobile computing devices) in the test dataset 108.

The memory area 206 further stores accuracy values 226 derived from a comparison between the device location estimates 224 and the corresponding observation locations, as described herein. The accuracy values 226 represent, for example, an error distance. The memory area 206 further stores one or more modeling algorithms 228 and one or more location inference algorithms. Alternatively or in addition, the modeling algorithms and location inference algorithms are stored remotely from the computing device 202. Collectively, the modeling algorithms and location inference algorithms may be associated with one or more of a plurality of location determination methods, and provided by a locating service.

The memory area 206 further stores one or more computer-executable components. Exemplary components include a constructor component 232, a modeling component 234, an inference component 236, an error component 238, a scaling component 240, and a characterization component 242. The constructor component 232, when executed by the processor 204, causes the processor 204 to separate the crowd-sourced location observations 102 and the non-RF related location factors into the training dataset 106 and the test dataset 108. The constructor component 232 assigns the crowd-sourced location observations 102 to one or more geographic tiles or other geographic areas based on the observation locations 214 in each of the crowd-sourced location observations 102. In some implementations, the crowd-sourced location observations 102 (and/or the non-RF related location factors 100) may be grouped by beacon to enable searching for location observations 102 based on a particular beacon of interest.

The modeling component 234, when executed by the processor 204, causes the processor 204 to determine the beacons model 222 based on the location observations in the training dataset 106. In implementations that contemplate beacon location estimate, for each beacon, the beacon location estimates are calculated based on the observation locations in the training dataset 106 associated with the beacon. That is, aspects of the disclosure infer the location of each beacon based on the location observations in the training dataset 106 that involve the beacon. As a result, in such implementations, the modeling component 234 generates models 114 including a set of beacons 212 and approximate locations of the beacons 212.

The modeling component 234 implements at least one of the modeling algorithms 228. The inference component 236, when executed by the processor 204, causes the processor 204 to determine, for each of the location observations in the test dataset 108, the device location estimate for the observing computing device 210 based on the beacon model determined by the modeling component 234. The inference component 236 implements the location inference algorithms 230, and is operable with any exemplary algorithm (e.g., refining algorithm) for determining a location of one of the observing computing devices 210 based on the beacons model 222, as known in the art. For each of the location observations in the test dataset 108, the inference component 236 further compares the device location estimate 224 for the observing computing device 210 to the known observation location 214 of the observing computing device 210 in the test dataset 108 to calculate the accuracy value 226.

The error component 238, when executed by the processor 204, causes the processor 204 to calculate an aggregate accuracy value for each of the tiles based on the calculated accuracy values 226 of the location observations assigned thereto in the test dataset 108. For example, the error component 238 groups the calculated accuracy values 226 of the test dataset 108 per tile, and calculates the aggregate accuracy value for each tile using the grouped accuracy values 226.

The scaling component 240, when executed by the processor 204, causes the processor 204 to adjust a size of the tiles to analyze the accuracy values 226 aggregated by the error component 238. The size corresponds to one of a plurality of levels of spatial resolution. As the size of the tiles changes, aspects of the disclosure re-calculate the aggregate accuracy values, and other analytics, for each of the tiles.

The characterization component 242, when executed by the processor 204, causes the processor 204 to calculate data quality attributes and data density attributes for the crowd-sourced location observations 102 in particular view of the non-RF related factors 100. Exemplary data quality attributes and exemplary data density attributes are described below with reference to FIG. 4. Further, the error component 238 may perform a trend analysis on the data quality attributes and the data density attributes calculated by the characterization component 242. The trend analysis illustrates how these statistics evolve over time. For example, for a given tile, the trend analysis shows how fast the observation density increases or how the error distance changes over time. In some implementations, the characterization component 242 compares the calculated aggregate accuracy values to beacon density in, for example, a scatter plot.

Referring next to FIG. 3, an exemplary flowchart illustrates operation of the computing device 202 (e.g., cloud service) to calculate aggregate accuracy values associated with performance of location determination methods. In some implementations, the operations illustrated in FIG. 3 are performed by a cloud service such as a location determination service. At 302, the training dataset 106 and the test dataset 108 are identified. For example, the crowd-sourced location observations 102 and the non-RF related factors 100 (such as non-RF location or positioned observations) are divided into the training dataset 106 and the test dataset 108. The crowd-sourced location observations 102 may be divided based on the observation times associated therewith. For example, the training dataset 106 may include the crowd-sourced location observations 102 and/or the non-RF related factors 100 that are older than two weeks, while the test dataset 108 may include the crowd-sourced location observations 102 and/or the non-RF related factors 100 that are less than two weeks old. Aspects of the disclosure contemplate, however, any criteria for identifying the training dataset 106 and the test dataset 108. For example, the location observations 102 (as well as the non-RF related factors 100 in certain implementations) may be divided based on one or more of the following: geographic area, type of observing computing device, location data quality, mobility of observing computing device, received signal strength availability, and scan time difference (e.g., between the ends of Wi-Fi and GPS scans).

Further, in some implementations, the crowd-sourced location observations 102 and/or the non-RF related factors 100 are preprocessed to eliminate noisy data or other data with errors. For example, the crowd-sourced location observations 102 may be validated through data type and range checking and/or filtered to identify location observations 102 that have a low mobility indicator.

Each of the crowd-sourced location observations 102 has an observing computing device (e.g., a mobile computing device) associated therewith. At 304, the crowd-sourced location observations 102 are assigned to one or more geographic areas. The crowd-sourced location observations 102 may be assigned based on a correlation between the geographic areas and the observation locations 214 associated with each of the crowd-sourced location observations 102.

At 306, the beacons model is determined from the training dataset 106. In implementations in which beacon location estimate is contemplated, beacon location estimates representing the estimated locations of the beacons 212 are calculated as part of the beacons model 222. The beacon location estimate for each beacon is determined based on the observation locations 214 of the observing computing devices 210 in the location observations in the training dataset 106 that include the beacon. The beacon location estimate is calculated by executing a selection of at least one of the modeling algorithms.

At 308, device location estimates 224 for the observing computing devices 210 associated with the location observations in the test dataset 108 are determined. For example, the device location estimate for the observing computing device 210 in one of the location observations in the test dataset 108 is determined based on the beacons model 222. The device location estimates 224 are calculated by executing a selection of at least one of the location inference algorithms 230.

At 310, for each of the location observations in the test dataset 108, the determined device location estimate 224 is compared to the observation location 214 of the observing computing device 210 associated with the location observation. The comparison produces the accuracy value. In some implementations, the accuracy value represents an error distance, a distance between the observation location 214 of the observing computing device 210 and the calculated device location estimate 224 of the observing computing device 210, or any other measure indicating accuracy.

At 312, for each of the geographic areas, the accuracy values 226 associated with the location observations assigned to the geographic area from the test dataset 108 are combined to calculate an aggregate accuracy value. For example, a mean, median, cumulative distribution function, trend analysis, or other mathematical function may be applied to the accuracy values 226 for each of the geographic areas to produce the aggregate accuracy value for the geographic area.

In some implementations, the training dataset 106 and the test dataset 108 are characterized or otherwise analyzed to produce dataset analytics at 305. Exemplary dataset analytics include data quality attributes, data density attributes, and an environment type (e.g., rural, urban, dense urban, suburban, indoor, outdoor, etc.) for each of the geographic areas. Further, the performance of the selected modeling algorithm 228 and the selected location inference algorithm 230 may be analyzed to produce quality analytics. In some implementations, the dataset analytics are correlated to the quality analytics to enable identification and mapping between qualities of the input data to the resulting performance of the location methods.

Figure 4:
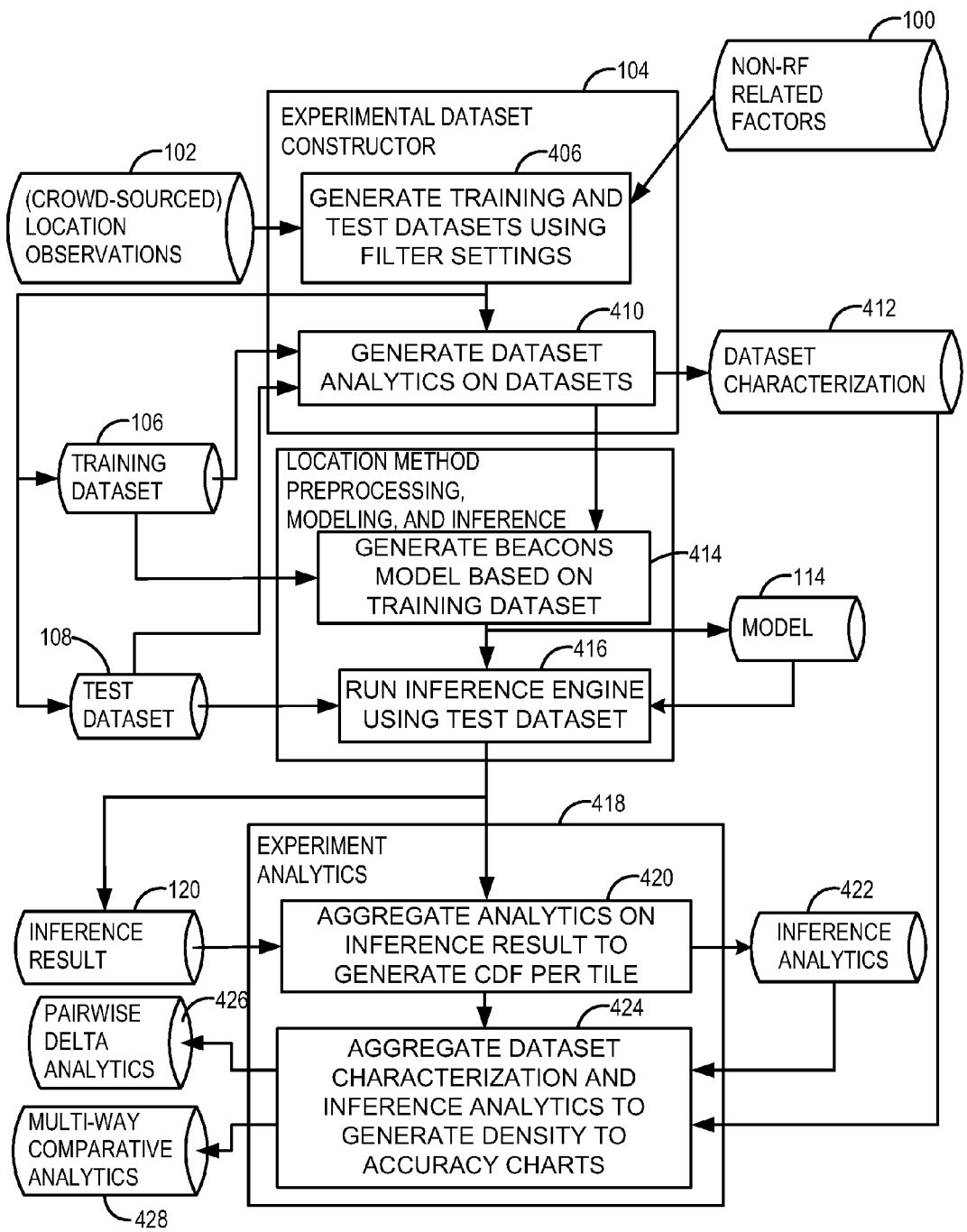
FIG. 4 is an exemplary block diagram illustrating a pipeline for performing analytics on location determination methods using datasets derived from location observations.

Referring next to FIG. 4, an exemplary block diagram illustrates a pipeline for performing analytics on location determination methods using datasets derived from location observations 102 and non-RF related factors 100. The experimental dataset constructor 104 takes crowd-sourced location observations 102 and the non-RF related factors 100 (such as non-RF location or positioned observations) and generates the training dataset 106 and the test dataset 108 based on, for example, filter settings at 406. Dataset analytics are generated for the training dataset 106 and the test dataset 108 at 410. The dataset analytics are stored as dataset characterizations 412.

Exemplary dataset analytics include characterizations in terms of one or more of the following, at various levels of spatial resolutions: cumulative distribution function, minimum, maximum, average, median, and mode. The dataset analytics include data quality attributes, data density attributes, and environment type. Exemplary data quality attributes include one or more of the following: HEPE, speed/velocity distribution, heading distribution, and delta time stamp. The HEPE represents the estimated 95% location error (e.g., in meters). The delta time stamp represents the difference (e.g., in milliseconds) between the completion of a Wi-Fi access scan and a GPS location fix. Exemplary data density attributes include one or more of the following: observation density (e.g., the number of observations per square kilometer), beacon density (e.g., the number of beacons 212 per square kilometer), distribution of the number of beacons per scan, and distribution of observations per beacon.

Preprocessing, modeling, and inference are performed specific to a particular locating method. For example, the locating method includes at least one of the modeling algorithms 228 and at least one of the location inference algorithms 230. Models 114 are generated at 414 based on the training dataset 106. The inference engine 118 uses the models 114 at 416 to process the test dataset 108 and produce inference results 120.

Experiment analytics 418 are next performed. Analytics on the inference results 120 are aggregated at 420 to generate, for example, a cumulative distribution function (CDF) per geographic tile. The aggregated analytics are stored as inference analytics 422. The inference analytics combine different inference results 120 together and aggregate them by geographic tile. The dataset characterization and inference analytics are aggregated to generate, for example, density to accuracy charts at 424. Further, pairwise delta analytics 426 and multi-way comparative analytics 428 may also be performed. The pairwise delta analytics 426 and the multi-way comparative analytics 428 enable finding a correlation between training data properties and error distance analytics reports. The result of this data may be visually analyzed as a scatter graph or pivot chart. For example, the pairwise delta analytics 426 examine the difference between error distances of two alternative methods versus a data metric such as beacon density. In another example, the multi-way comparative analytics 428 illustrate the relative accuracy of multiple experiments give a particular data quality or density metric. Other analytics are contemplated, such as per beacon analytics.

In some implementations, the experiment analytics 418 have several levels of granularity. There may be individual inference error distances, intra-tile statistics (e.g., 95% error distance for a given tile), inter-tile analytics (e.g., an accuracy vs. beacon density scatter plot for an experiment), and inter-experiment comparative analytics.

Exemplary intra-tile statistics include one or more of the following: test dataset analytics (e.g., beacon total, beacon density, beacon count per inference request), query success rate, cumulative distribution function (e.g., 25%, 50%, 67%, 90%, and 95%), and other statistics such as minimum, maximum, average, variance, and mode. Exemplary inter-tile analytics are summarized from training data over a plurality of geographic tiles and may include scatter plots illustrating one or more of the following: error vs. observation density, error vs. observed beacon density, error vs. number of access points used in the inference request, and error vs. data density and data quality.

Aspects of the disclosure may further relate dataset analytics to accuracy analytics. In some implementations, there is a continuous model (e.g., no estimate of beacon location) and a discrete model, although other models are contemplated. In the continuous model, D is a data density function and Q is a data quality function. The function D is a data density function of observation density, beacon density, and the distribution of the number of access points per scan. The function Q is a data quality function of HEPE distribution, speed distribution, delta time stamp distribution, and heading distribution. For a given training dataset 106 and a particular geographic tile, aspects of the disclosure calculate the data density indicator and the data quality indicator using the functions D and Q. When combined with a selected accuracy analytic A such as 95% error distance, aspects of the disclosure operate to create a three-dimensional scatter plot, where each data point in the plot is of the form (X=D, Y=Q, Z=A).

In the discrete model, for a particular training dataset 106, aspects of the disclosure classify each geographic tile that covers an area of the training dataset 106 as (D, Q), where values for D and Q are selected from a discrete set of values (e.g., low, medium, and high). As crowd-sourced data grows in volume and improves in quality, more tiles are expected to move from (D=low, Q=low) to (D=high, Q=high).

Figure 5:
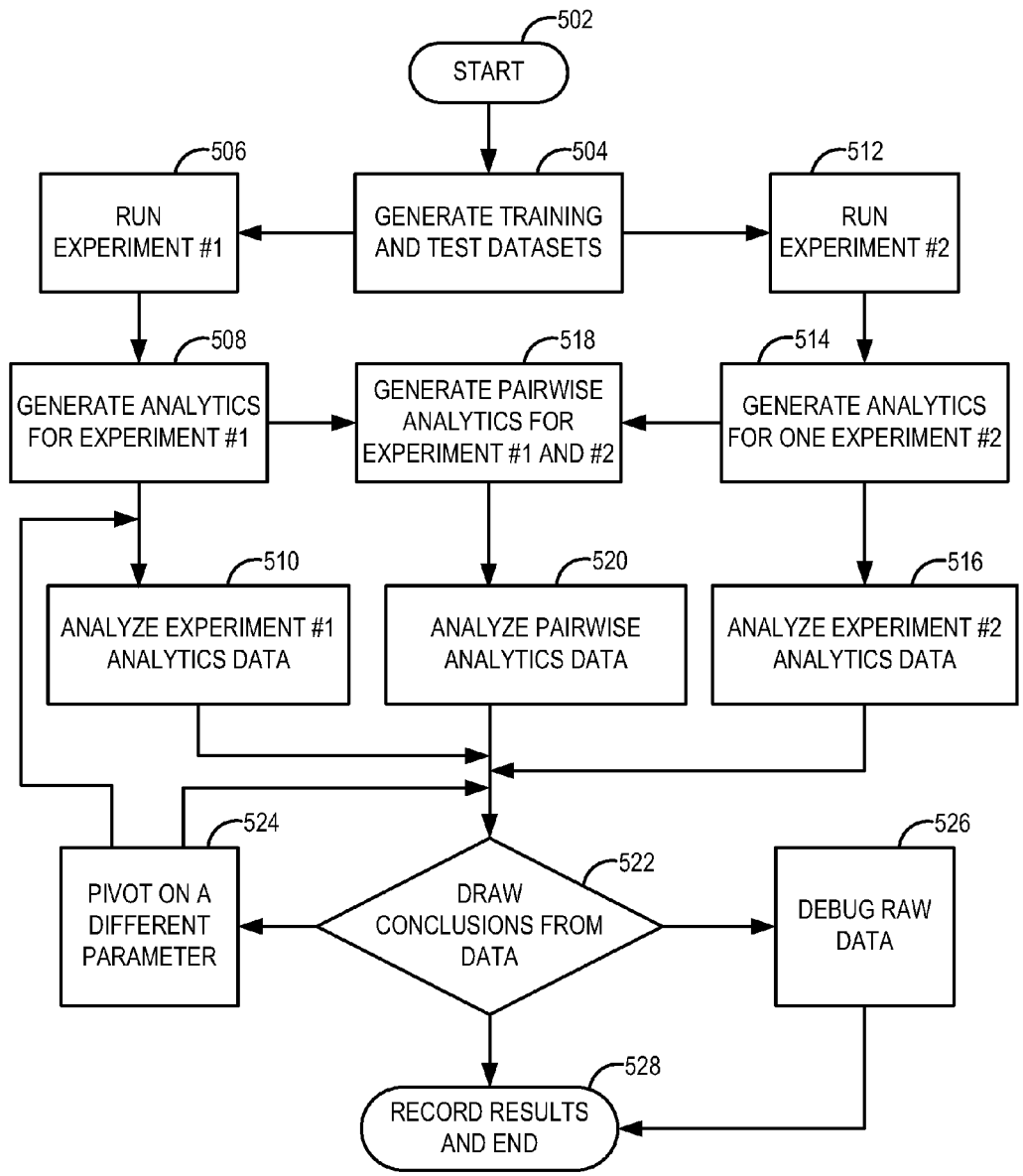
FIG. 5 is an exemplary experiment process flow diagram illustrating comparison of the performance of two experiments using different location determination methods.

Referring next to FIG. 5, an exemplary experiment process flow diagram illustrates a comparison of the performance of two experiments using different location determination methods. The process begins at 502. The training dataset 106 and the test dataset 108 are generated at 504 from the crowd-sourced location observations 102 and the non-RF related factors 100. At 506, a first experiment is conducted using a particular locating method (e.g., using at least one of the modeling algorithms 228 and at least one of the location inference algorithms 230 on a particular training dataset 106 and test dataset 108). Performance analytics are generated for the first experiment at 508, as described herein, and then analyzed at 510. For example, an error distance graph per tile may be created.

At 512, a second experiment is conducted using another locating method (e.g., different modeling algorithm 228 and/or different location inference algorithm 230 from the first experiment). Performance analytics are generated for the second experiment at 514, as described herein, and then analyzed at 516. Pairwise analytics are generated for the first and second experiments at 518, and then analyzed at 520. For example, an error distance difference per tile may be created for each of the locating methods to enable identification of the locating method providing the better accuracy (e.g., smaller error distance).

At 522, the analyzed analytics data may be reviewed to draw conclusions such as whether a correlation can be seen between any of the characteristics of the training dataset 106 and error distance, whether one locating method performs better than another for a particular combination of data quality and data density, and the like. If anomalies are detected (e.g., two tiles with similar observation density show varied error distance), the raw location observation data may be debugged at 526. Further, the experiments may be re-run after pivoting on a different parameter at 524. For example, if there is no correlation between observation density and error distance, the experiments may be re-run to determine whether there is a correlation between HEPE and error distance. In addition, at 528, the results are recorded and the process may end.

In some implementations, the operations illustrated in FIG. 5 may generally be described as follows. In a first experiment, a first one of a plurality of the modeling algorithms 228 is selected and executed with the training dataset 106 as input. This results in the creation of the beacons model 222 based on the training dataset 106. A first one of a plurality of location inference algorithms 230 is selected and executed with the test dataset 108 and the beacons model 222 as input. This results in creation of device location estimates 224 for the observing computing devices 210. The device location estimates 224 are compared to the observation locations 214 of the observing computing devices 210 to calculate accuracy values 226. The accuracy values 226 are assigned to the geographic areas based on the observation location 214 of the corresponding location observations in the test dataset 108. Aggregate accuracy values are created by combining the accuracy values 226 from each of the geographic areas.

In a second experiment, the beacons model 222 is recalculated using a second selected modeling algorithm 228 and the device location estimates 224 are recalculated using a second selected location inference algorithm 230. The aggregate accuracy values are re-calculated for each of the geographic areas to enable a comparison of the selected modeling algorithms 228 and the selected location inference algorithms 230 between the first experiment and the second experiment.

In some implementations, the computing selects the first or second modeling algorithms 228 and/or the first or second location inference algorithms 230 as the better-performing algorithm based on a comparison between the aggregated accuracy values of the first experiment and the second experiment.

In some implementations, a size of one or more of the geographic areas may be adjusted. The aggregate accuracy value, or other quality analytics, is calculated for each of the re-sized geographic areas by re-combining the corresponding accuracy values 226.

Figure 6:
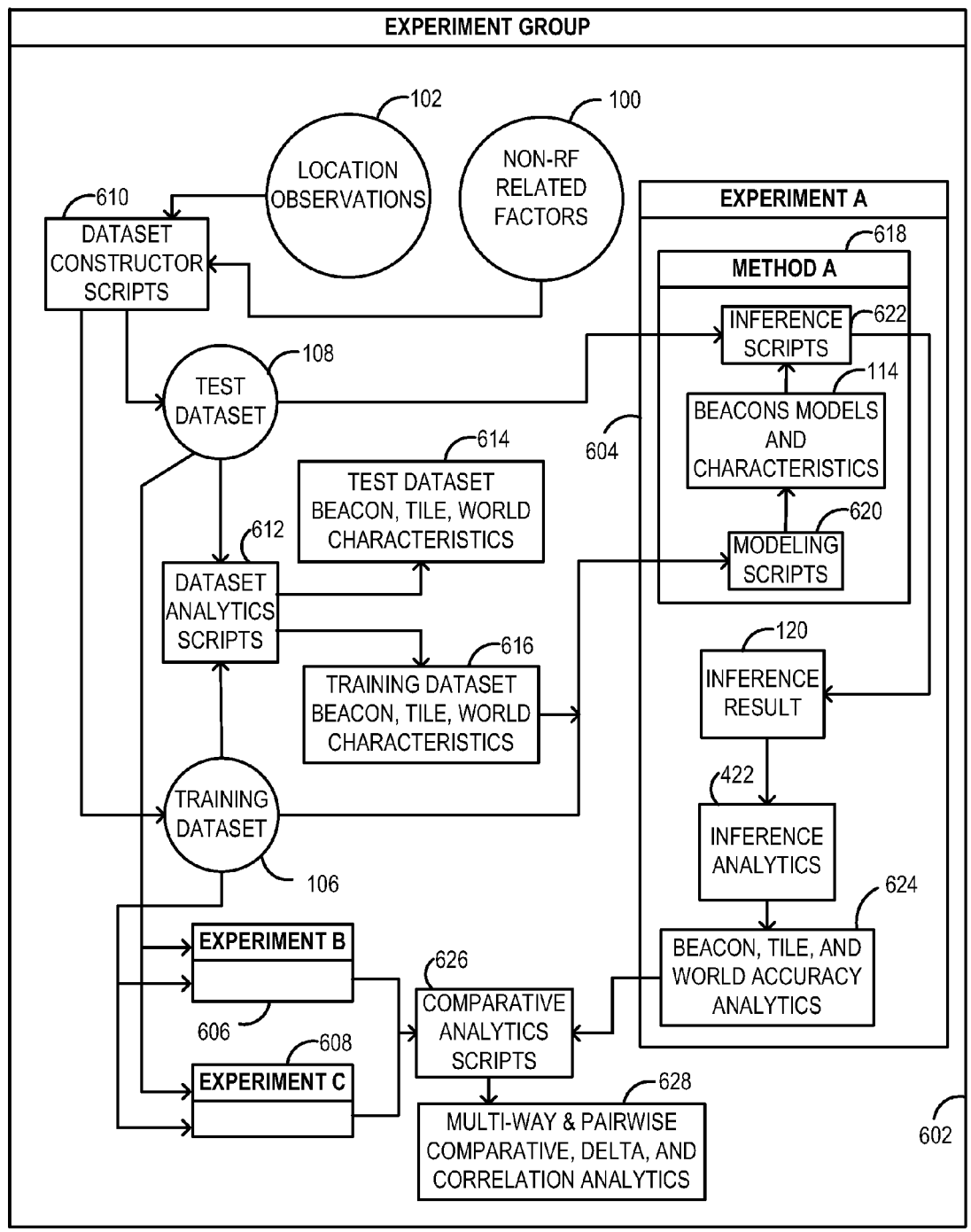
FIG. 6 is an exemplary block diagram illustrating an experiment group of three experiments for generating comparative analytics.

Referring next to FIG. 6, an exemplary block diagram illustrates an experiment group 602 of three experiments for generating comparative analytics. Each of the Experiment A 604, Experiment B 606, and Experiment C 608 represent the application of a selected modeling algorithm 228 and a selected location inference algorithm 230 to a particular training dataset 106 and test dataset 108. Dataset constructor scripts 610 create the training dataset 106 and the test dataset 108 from the location observations 102 and the non-RF related factors 100. Dataset analytics scripts 612 create training dataset characteristics 616 and test dataset characteristics 614 at the beacon, tile, and world (e.g., multiple tiles) levels to characterize the output at multiple levels of spatial resolution. In this way, aspects of the disclosure characterize the input data at multiple levels of spatial resolution.

Experiment A 604 applies a particular location method 618. This includes executing modeling scripts 620 to create models 114. Inference scripts 622 apply the models 114 to the test dataset 108 to create the inference results 120. Inference analytics are obtained from the inference results 120 to produce accuracy analytics 624 at the beacon, tile, and world (e.g., multiple tiles) levels.

Experiment B 606 and Experiment C 608 are performed using different location methods. Comparative analytics scripts 626 are performed on the accuracy analytics 624 from Experiment A 604 as well as the output from Experiment B 606 and Experiment C 608. Multi-way and pairwise comparative, delta, and correlation analytics are performed at 628.

Figure 7A:
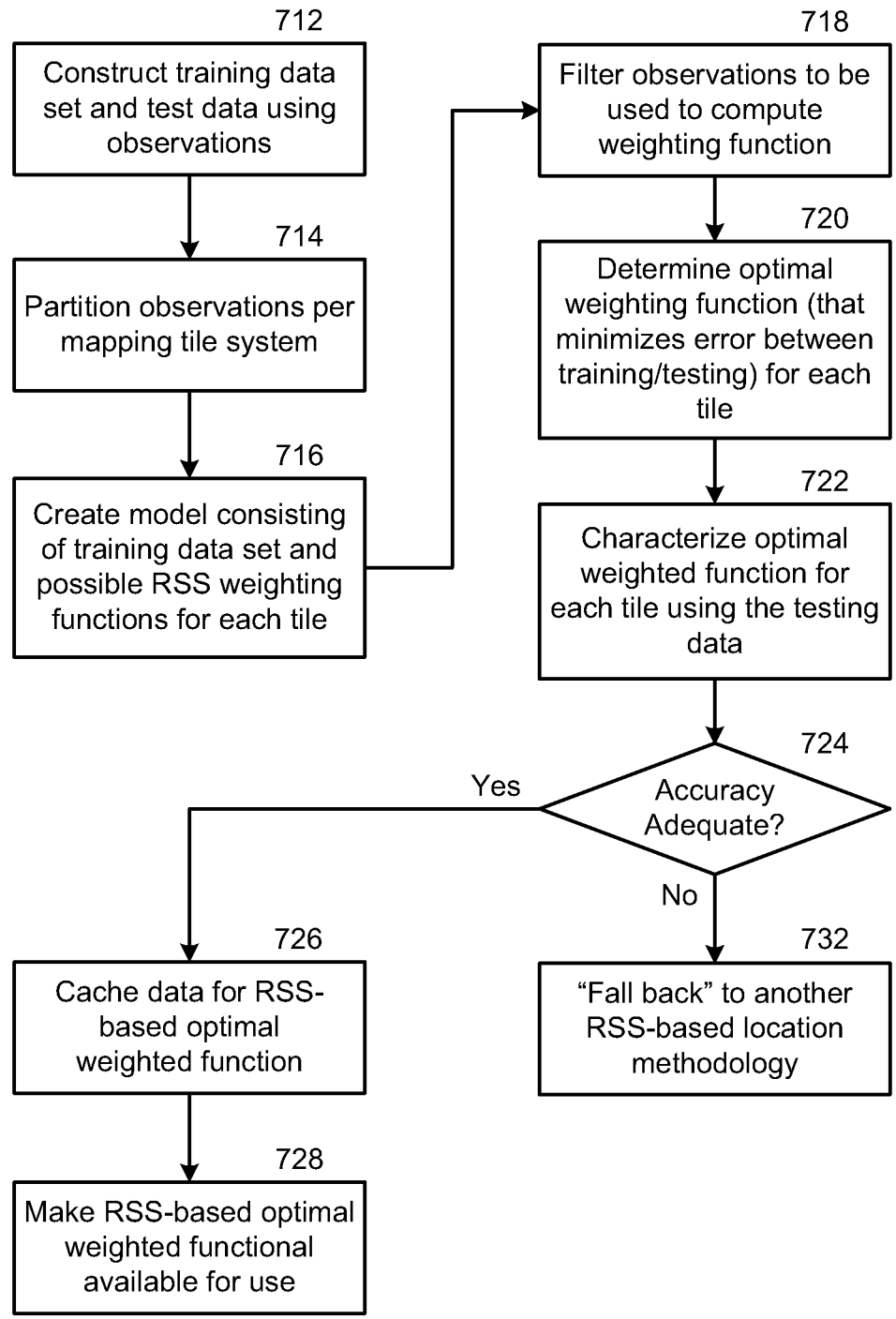
FIG. 7A is an exemplary flowchart illustrating operation of a computing device using RSS weighting functions with regard to various location determination methods.

FIG. 7A is an exemplary flowchart 700 illustrating operation of a computing device using RSS weighting functions with regard to various location determination methods. Referring to FIG. 7A, the training and test datasets consisting of observations (e.g., RSS measurements) are constructed at 712. At 714, these observations are partitioned per a mapping tile system. As discussed earlier herein, in an implementation, the mapping tile system may be a coverage area partitioned into grid squares at various levels of abstraction and scale using, for example, a spatial hierarchical decomposition approach used by certain web-based mapping services. Moreover, RSS-based weighted functions for each geographic area may be based on at least one observation corresponding to each geographic area, and each observation may comprises one of several factors such a beacon density, an observation density, and a beacons per scan value in addition to (or, in some cases, in lieu of) an RSS measurement.

At 716, a model is created that comprises training data set and possible RSS weighting function for each tile. At 718, the list of observations from the training dataset that will be used to compute the weighting function is filtered, for example, to include all the observations in the training dataset or a subset depending on the characteristics of the tile and the computational complexity of the weighting function.

At 720, for each tile, the optimal weighting function is determined from among the possible RSS weighting functions based on the training dataset that minimizes the error for the test data. In an implementation, the error may be a function of the deltas between GPS positions of observations in the test dataset and predicted positions from the RSS weighted functions applied to test data. The optimal weighting function may also incorporate additional factors that may not be available during an inference request, like GPS quality or the speed of the device while traveling in a vehicle, for example. In any event, an objective is to find the optimal weighting function that minimizes the differences between actual distances and predicted distances (based on the training and testing data respectively).

At 722, the accuracy of the optimal weighted function for each tile is characterized again using the test data and, if the accuracy is acceptable at 724 based on some predetermined threshold, then at 726 such implementations will proceed to cache the data corresponding to the optimal weighted function and consisting of the beacons and, at 728, the RSS based weighting function is made available for subsequent use. On the other hand, if the accuracy of the optimal weighted function is not acceptable, then at 730 the optimal weighted function is discarded and the RSS-based location methodology defaults to an alternative approach (such as a typical unweighted RSS function, that is, where each RSS-based reading is given equal weight).

For data preprocessing in certain implementation, it may be useful for the RSS values to be both available and validated (that is, to be negative and within a reasonable range) to maximize the accuracy of the optimal weighted function ultimately identified. Similarly, for certain implementations, it may be useful for the observations in the training and test data to be filtered based on a minimum RSS threshold as a condition for inclusion in the training and testing of the possible weighted functions. This approach allows for the selection of observations that will potentially move the center of the corresponding beacon circle closer to the included beacons' true locations. For certain implementations, modeling the beacon store may utilize a refining algorithm wherein the training data is filtered to define the minimum signal strength measured beacons meet in order to be included in the beacon store.

Figure 7B:
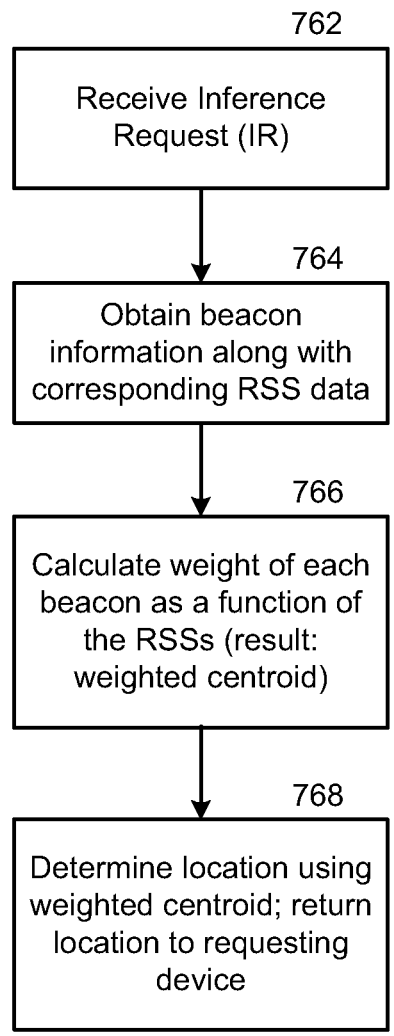
FIG. 7B is an exemplary flowchart illustrating utilization of the resulting optimal RSS-based weighted function based on an inference request representative of several implementations disclosed herein.

FIG. 7B is an exemplary flowchart 750 illustrating utilization of a resulting optimal RSS-based weighted function based on an inference request representative of several implementations disclosed herein. Referring to FIG. 7B, at 762, an inference request (IR) is received and, at 764, the beacons pertaining to a received inference request are obtained along with RSS data corresponding to each beacon.

At 766, the weight of each beacon is calculated as a function of the RSS measurements wherein the inferred location is the weighted centroid. At 768, this centroid is used to identify the location of the requesting device, and may be returned to the requesting device.

While a typical inference algorithm would typically give an equal weight to all the beacons which are observed by the device and passed into inference request, several implementations disclosed herein use an RSS-weighted centroid method reflecting the idea that beacon data should be given weights based on their respective RSSs such that stronger RSSs are presumed to indicate beacons that are closer to the device and thereby providing a more accurate measurement of RSS. More specifically, for a given beacon B, the weighting of B is a function of $RSS_B$ from B:

$$W(B)=f_i(RSS_B)$$

where $f_i$ denotes various types of weight functions for different values of i. For example, $$f_1(RSS_B)=1/|RSS_B|$$

Moreover, for several implementations, the RSS weighted centroid mentioned above—which is to be selected as the optimal weighting function for each tile given a training and a test dataset—may be implemented by creating a beacon store $S_i$ for each weighting function $f_i$ for each tile using the training data corresponding to each such tile. Then, for each i, the error curve for $S_i$ may be computed using the test data in that tile, after which the $f_i$ with the best accuracy can be selected as the weighting function for that tile. For certain alternative implementations, however, the top k weighting functions might also be combined to form a new weighting function based on the collective error curves. Regardless, it should be noted that the optimal $f_i$ may change with time as the training and test datasets change; consequently, once the weighting function for tile t, Ft( ) is determined, the beacon store for that tile may be created and the error curve for tile t may be computed from the corresponding test data and, if the accuracy is acceptable, the cache data that consists of the tile beacon store and the weighting function Ft( ) can be created.

This method, an example of which is described above with respect to FIGS. 7A and 7B, provides techniques for forming RSS-based weighted functions from a training dataset and a testing dataset. In certain implementations, the method may incrementally update the weighted function as the training dataset grows. Moreover, this approach also enables the selection of RSS data for the weighted functions from crowd-sourced data. In addition, by inferring location from a combination of the k nearest RSS readings per the RSS-weighted function, and by predicting likely error performance (accuracy) from a test dataset, this approach also enables the determination of whether the accuracy is acceptable: if not, to fall back to typical RSS-based location methods; but if so, to create cache data for mobile devices to resolve location on the device autonomously.

At least a portion of the functionality of the various elements in FIG. 2A, FIG. 2B, and FIG. 4 may be performed by other elements in the figures, or an entity (e.g., processor, web service, server, application program, computing device, etc.) not shown in the figures. In some implementations, the operations illustrated in FIG. 3 and FIG. 5 may be implemented as software instructions encoded on a computer readable medium, in hardware programmed or designed to perform the operations, or both. For example, aspects of the disclosure may be implemented as a system on a chip. Moreover, while no personally identifiable information is tracked by aspects of the disclosure, implementations have been described with reference to data monitored and/or collected from users. In such implementations, notice is provided to the users of the collection of the data (e.g., via a dialog box or preference setting) and users are given the opportunity to give or deny consent for the monitoring and/or collection. The consent may take the form of opt-in consent or opt-out consent.

Of course, the implementations illustrated and described herein as well as implementations not specifically described herein but within the scope of aspects of the embodiments constitute exemplary means for creating models 114 based on the training dataset 106, and exemplary means for comparing the accuracy of different modeling algorithms 228 and different location inference algorithms 230 based on the aggregated accuracy values for the tiles.

Figure 8:
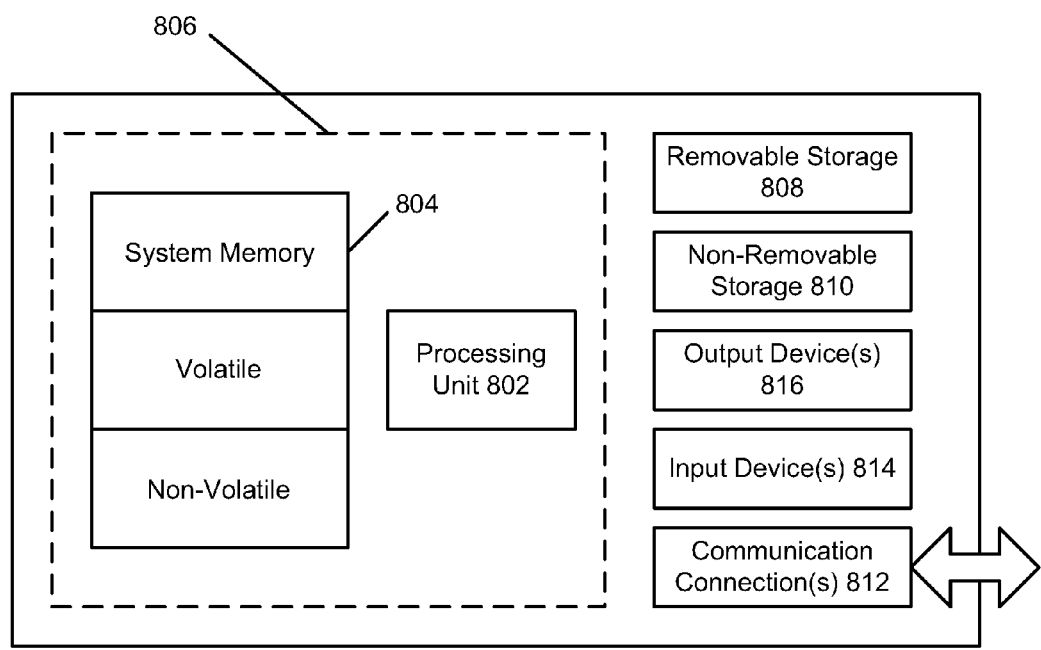
FIG. 8 shows an exemplary computing environment.

FIG. 8 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, mobile communications devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communications connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of location determination for performance by a device comprising a processor, the method comprising:
    dividing a plurality of crowd-sourced location observations into a training dataset and a test dataset, each of the crowd-sourced location observations comprising an observation location corresponding to each device from among a plurality of computing devices;
    assigning the crowd-sourced location observations to at least one geographic area of a plurality of geographic areas based on the observation locations associated with each of the crowd-sourced location observations and a corresponding location associated with each of the geographic areas;
    determining a plurality of possible received signal strength (RSS)-based weighted functions for each geographic area based on at least one crowd-sourced location observation corresponding to each geographic area; and
    determining an optimal weighted function from among the plurality of possible RSS-based weighted functions based on the training dataset and the testing dataset.

2. The method of claim 1, wherein the at least one crowd-sourced location observation comprises an RSS measurement.

3. The method of claim 1, further comprising comparing a determined device location estimate to the observation location of the device corresponding to the crowd-sourced location observation in the test dataset to calculate an accuracy value.

4. The method of claim 3, further comprising discarding the optimal weighted function based on a threshold limit.

5. The method of claim 1, wherein each of the crowd-sourced location observations further comprises a set of beacons observed by each device from among the plurality of computing devices, and wherein each RSS measurement is for each beacon among each set of beacons, the method further comprising, prior to the dividing, confirming that each RSS value is both available and validated.

6. The method of claim 1, further comprising, prior to the assigning, filtering each crowd-sourced location observation to remove any RSS value that does not meet a predetermined minimum threshold.

7. The method of claim 1, further comprising utilizing the optimal weighted function to determine a location for a request device.

8. A system for determining a location of a device, the system comprising:
    a memory area associated with a computing device, said memory area storing location data comprising a plurality of crowd-sourced location observations, each of the crowd-sourced location observations including a set of beacons observed by one of a plurality of mobile computing devices and a received signal strength (RSS) measurement for each beacon and an observation location of the mobile computing device, said location data including training data and test data; and
    a processor programmed to:
        divide the location data into a training dataset and a test dataset;
        assign the location data to at least one geographic area based on the observation locations associated with each of the crowd-sourced location observations and a location associated with each of the geographic areas;
        determine a plurality of possible RSS-based weighted functions for each geographic area based on the crowd-sourced location observations corresponding to each geographic area; and
        determine an optimal weighted function from among the plurality of possible RSS-based weighted functions based on the training dataset and the testing dataset.

9. The system of claim 8, wherein the at least one geographic area is a mapping tile system.

10. The system of claim 8, wherein the optimal weighted function is a weighted function from among the plurality of possible RSS-based weighted functions that has a lowest error.

11. The system of claim 10, wherein the error is calculated as a function of deltas between a plurality of RSS data comprising the test dataset.

12. The system of claim 8, wherein the optimal weighted function gives the greatest weight to a beacon with the strongest RSS.

13. The system of claim 8, wherein the optimal weighted function is derived using only RSS values that exceed a predetermined minimum threshold.

14. The system of claim 8, wherein the optimal weighted function is derived using only locations from a GPS receiver.

* * * * *